(12) United States Patent
Popescu et al.

(10) Patent No.: US 7,747,067 B2
(45) Date of Patent: Jun. 29, 2010

(54) SYSTEM AND METHOD FOR THREE DIMENSIONAL MODELING

(75) Inventors: Voicu S. Popescu, Carmel, IN (US); Elisha Sacks, Indianapolis, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1097 days.

(21) Appl. No.: 10/961,456

(22) Filed: Oct. 8, 2004

(65) Prior Publication Data
US 2005/0128196 A1 Jun. 16, 2005

Related U.S. Application Data

(60) Provisional application No. 60/509,748, filed on Oct. 8, 2003.

(51) Int. Cl.
*G06K 9/00* (2006.01)
(52) U.S. Cl. .................................................... 382/154
(58) Field of Classification Search ........................ None
See application file for complete search history.

(56) References Cited

U.S. PATENT DOCUMENTS

| | | | |
|---|---|---|---|
| 6,201,881 B1 * | 3/2001 | Masuda et al. | 382/100 |
| 6,278,457 B1 * | 8/2001 | Bernardini et al. | 345/420 |
| 6,503,195 B1 * | 1/2003 | Keller et al. | 600/160 |
| 6,606,406 B1 * | 8/2003 | Zhang et al. | 382/154 |
| 6,756,993 B2 | 6/2004 | Popescu et al. | |
| 6,762,427 B1 * | 7/2004 | Kong et al. | 250/559.22 |
| 6,891,535 B2 * | 5/2005 | Perry et al. | 345/420 |
| 6,903,738 B2 * | 6/2005 | Pfister et al. | 345/420 |
| 7,043,465 B2 * | 5/2006 | Pirim | 706/20 |
| 2003/0071194 A1 * | 4/2003 | Mueller et al. | 250/208.1 |
| 2005/0074162 A1 * | 4/2005 | Tu et al. | 382/154 |

OTHER PUBLICATIONS

Harvey, et al., "Compact and Portable 3D Camera for Space Applications," IEEE, Mar. 2001. 7 pps.
Borghese. el al., "Autoscan: A Flexible and Portable 3D Scanner," IEEE Computer Graphics and Applications. May/Jun. 1998. 4 pps.
Hebert, Patrick, "A Self-Referenced Hand-Held Range Sensor," IEEE, Mar. 2001. 8 pps.
Popescu, et al., "Interactive Point-Based Modeling from Dense Color and Sparse Depth," Eurographics Symposium on Point-Based Graphics. The Eurographics Association, Jun. 2004, 8 pps.
Strat, et al., "A Point-and-Shoot Color 3D Camera," Proceedings of the Fourth International Conference on 3-D Digital Imaging and Modeling, IEEE Computer Society, Oct. 2003, 8 pps.
Rusinkiewicz, et al., "Real-Time 3D Model Acquisition," Association for Computing Machiner. Inc., 2002, 9 pps.
Koninckx, et al., "Real-time Range Scanning of Deformable Surfaces by Adaptively Coded Structured Light," Proceedings of the Fourth International Conference on 3-D Digital Imaging and Modeling, IEEE Computer Society, Oct. 2003, 8 pps.

\* cited by examiner

*Primary Examiner*—Vikkram Bali
*Assistant Examiner*—Elisa M Rice
(74) *Attorney, Agent, or Firm*—Bose McKinney & Evans

(57) ABSTRACT

An apparatus and method for creating a 3D model of a scene. A plurality of light beams are projected onto the scene and their imaged projections are analyzed to capture surface information of the scene at a plurality of dots where the light beams intersect the scene. Surface information is used to register consecutive video frames and to construct a 3D model of the scene.

19 Claims, 11 Drawing Sheets

SYSTEM AND METHOD FOR THREE DIMENSIONAL MODELING

CROSS-REFERENCE TO RELATED APPLICATION

This application claims benefit to U.S. Provisional Application No. 60/509,748, filed on Oct. 8, 2003.

FIELD OF THE INVENTION

The present disclosure relates to three dimensional (3D) modeling of scenes, and more particularly to apparatus and techniques for actively modeling scenes using structured light.

BACKGROUND AND SUMMARY OF THE INVENTION 3D models are used by computer graphics programs in games and entertainment, training simulations, to create virtual museums, libraries, buildings and structures, to map terrain, and to create animated and non-animated objects. Increased demand for 3D content for use by these programs, particularly more complex and realistic 3D models, has led to rapid evolution of systems that create 3D models directly from real scenes, including models of objects placed in real scenes. Although hardware continues to improve, and the cost of both hardware and software continues to decrease, these performance and economic improvements have not sufficed to overcome the difficulty involved in synthesizing realistic 3D models with portable and inexpensive equipment.

Various techniques have been developed to gather texture and depth information at various scene points by processing data contained in video frames of a scene to create a 3D model of the scene. Because a frame is a two-dimensional (2D) representation of a 3D scene, a point in a frame does not uniquely determine the location of a corresponding point in a scene. Additional information is required to reconstruct a scene in 3D from 2D information. A known technique uses stereoscopic imaging equipment having two cameras to capture a stereo video of a scene. Prior to capturing the stereo video, the cameras are calibrated so that their video can be registered in a common coordinate system. The cameras differ only in the location of their optical centers, which is a function of system design and is therefore known. By triangulating the distance between the location of the camera's optical centers and information about points in frames corresponding to landmark scene points, depth information about the landmark points can be deduced.

In a conventional technique for mapping 3D surfaces, a polygon mesh is generated that approximates the 3D surface of the scene. In this technique, each of the points in frames generates a vertex of a polygon and defines a boundary of the polygon. A 3D "mesh model" is constructed by combining the polygon shapes in a manner analogous to piecing together a puzzle where each piece of the puzzle is a polygon shape. The realism and quality of a 3D model obtained by this method depends on the use of two cameras, availability of landmark scene points, and use of computer algorithms to identify landmark scene points in the images. Essentially, the algorithms must process all the pixel data from each frame to identify landmark scene points. Clearly then, this method is computationally costly to implement.

Imaging of complex scenes sometimes causes the registration of multiple frames to fail. Failure can be caused by many factors, such as, for example, the loss of frame points due to camera or scene movement. When video processing occurs after video is captured, the registration failure may not be easily or optimally corrected. However, if video capturing and processing occurred near simultaneously, registration failures could be corrected in real-time.

It is therefore desirable, to provide a system capable creating realistic 3D models of scenes quickly and cost effectively.

The present invention includes an apparatus, referred to herein as the ModelCamera, and a method for creating 3D models. The ModelCamera includes a video camera, a plurality of light beams, a frame for fixedly connecting the camera and the plurality of light beams in a fixed relationship, and a computer, the computer being capable of transferring data to and from the video camera.

In a preferred embodiment, the ModelCamera is configured to simultaneously video a scene and produce an evolving 3D model.

In another preferred embodiment, the ModelCamera is mounted on a bracket that allows it to pan and tilt around its center of projection.

In another embodiment, a method for modeling a structured 3D scene is disclosed. The method includes the steps of capturing video frames of a scene, identifying and characterizing a plurality of image dots in the video frames, obtaining color information from a multitude of pixels in each frame, registering each additional frame with respect to the previous frame using dot depth and pixel color information, adding new or better information, eliminating redundant information, and constructing a 3D model.

In another embodiment, the 3D model is an evolving 3D model obtained by interactively capturing scenes. Interactivity is achieved by constructing the 3D model in real-time, observing the model's evolution, identifying areas in the model where additional definition is desirable, optionally capturing additional video frames corresponding to the area where additional definition is desirable, and merging information obtained from the additional video with the evolving model to enhance the model.

BRIEF DESCRIPTION OF THE DRAWINGS

The above set forth and other features of the invention are made more apparent in the ensuing detailed description of the invention when read in conjunction with the attached drawings, wherein.

DETAILED DESCRIPTION OF EXEMPLARY EMBODIMENTS

Figure 1:
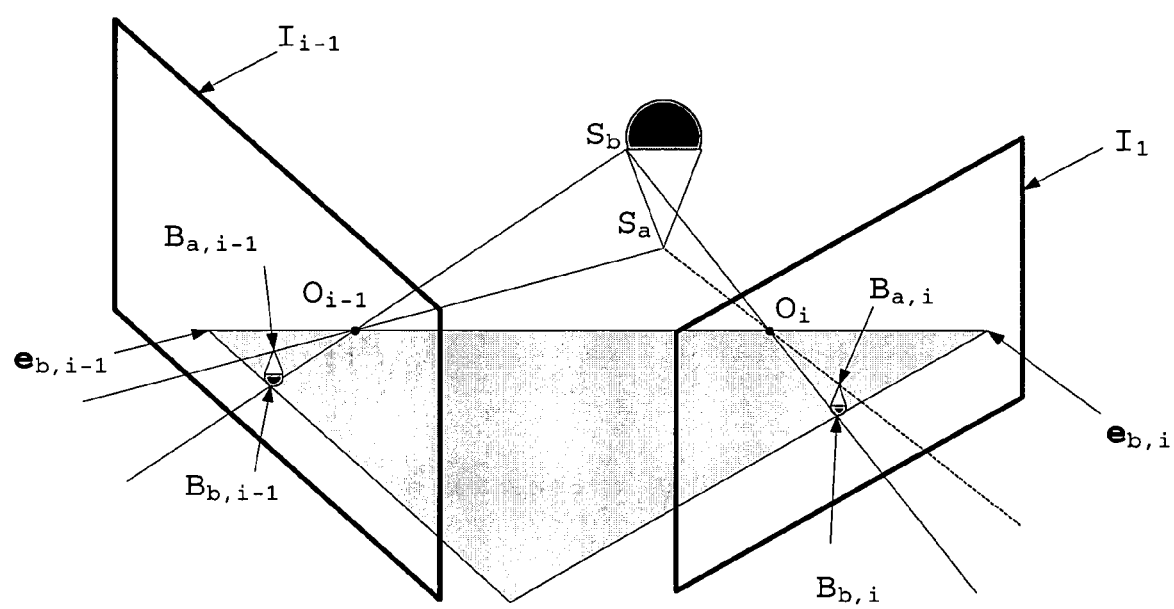
FIG. 1 is a representation of an object in epipolar geometry

While the present invention is susceptible to various modifications and alternative forms, exemplary embodiments thereof have been shown by way of example in the drawings and will herein be described in detail. It should be understood, however, that there is no intent to limit the system to the particular forms disclosed, but on the contrary, the intention is to address all modifications, equivalents, and alternatives falling within the spirit and scope of the system as defined by the appended claims.

Set forth below are definitions of some terms used herein.

"Compression" means the translation of data (video, audio, digital, or a combination) to a more compact form for storage or transmission.

"Compressed video" means a video that has been processed using a variety of computer algorithms and other techniques to reduce the amount of data required to accurately represent the content and thus the space required to store the content.

"Compression ratio" means a comparison of the amount of space saved by data compression. A compression ratio of 2:1 ("two to one") results in a doubling of the storage capacity.

"Data" are the means by which information is conveyed.

"Depth" in the context of this disclosure means the shortest distance from the camera image plane to a dot.

"Dot" means a point on the scene surface intersected by the projection of a light beam. An "image dot" is a point in a frame corresponding to a dot.

"Motion" is the operation of moving a surface or object. "Translation" is the operation of moving a surface or object by moving each one of its points the same amount along the same direction. "Rotation" is the operation of moving a surface or object by rotating each of its points by the same angle about the same axis. An axis is defined by a 3D point and a direction. Rotating a point about an axis is defined as moving the point on a circle that is perpendicular to the axis, has its center on the axis, and has the radius given by the distance from the point to the axis.

"Pixel" means the smallest element that sensors can detect and displays can display. The term is a contraction of "picture element". A display resolution described as being 640×480 has 640 pixels across the screen and 480 pixel down the screen, for a total of 307,200 pixels. The higher the number or pixels, the higher the screen resolution. A monochrome pixel can have two values, black or white, and this can be represented by one bit as either zero or one. At the other end of the scale, a true color monitor capable of displaying approximately 16.7 million colors requires 4 bytes of information, 24 bits of color information (RGB) and an alpha value for each pixel, and a buffer frame. A true color monitor with 640×480 pixel resolution requires 2,457,600 bytes, or 2.5 MB, of data per frame.

"Scene point" means a point on the scene surface.

"Transformation" is the mapping of data from one type of data structure or format to another. A transformation is reversible if the information in the data set can be recovered from a transformed data set. A transformation is lossy if a certain amount of error is introduced by the transformation yet the original information can still be substantially reconstructed from a transformed data set. A certain amount of error is often an acceptable trade-off for increased compression performance. A transformation is irreversible if the original information can not be substantially reconstructed from a transformed data set.

Having defined terms used herein, an introduction to camera geometry theory is provided.

When two images are taken from different viewpoints, a point in the scene will project onto a point in each of the images. If the camera positions and orientations are known, then the equations of the projection lines through these image points can be calculated. The position of the point in 3D can be calculated as the intersection of the two projection lines.

When two views are used, a new geometric property is introduced, known as the epipolar constraint. This constraint gives rise to epipolar geometry. When correspondence is established between the two images, the fundamental matrix can be calculated and used to determine the projective 3D structure of the imaged scene. The projective structure can then be transformed to affine and subsequently metric structure to accurately represent the scene in a computer model.

FIG. 1 shows schematically the underlying principles of epipolar geometry on which the invention is based. The schema shows a camera, represented by image plane "I" and optical center "O", at two different points in time, represented as time "i−1" and time "i". The image plane is a conceptual representation of the pixel array. The image projected in the pixel array is captured as a frame. Therefore, image planes $I_{i-1}$ and $I_i$ correspond to two consecutive frames. The relationship in space between the image plane "I" and optical center "O " is fixed by the camera's construction. In the calibration procedure, a six-dimensional matrix, called the fundamental matrix, is automatically calculated which defines the fixed parameters that relate the image plane and the optical center.

The scene in FIG. 1 is an ice cream cone. To aid in understanding, two scene points, $S_a$ and $S_b$, are shown. Each scene point is projected onto both image planes. Scene point $S_a$ projects onto image plane $I_{i-1}$ through a camera ray passing through optical center $O_{i-1}$ that intersects the image plane at image point $B_{a,\,i-1}$. Scene point $S_b$ projects onto image plane $I_{i-1}$ through a camera ray passing through optical center $O_{i-1}$ that intersects the image plane at image point $B_{b,\,i-1}$. After a frame is captured at time i−1, the camera moves and a new frame is captured at time i. At the new camera location, scene point $S_a$ projects onto image plane $I_i$ through a camera ray passing through optical center $O_i$ that intersects the image plane at image point $B_{a,i}$. Scene point $S_b$ projects onto image plane $I_i$ through a camera ray passing through optical center $O_i$ that intersects the image plane at image point $B_{b,\,i}$.

The epipolar geometry of scene point $S_b$ will now be illustrated. Because the intrinsic factors of the camera are fixed, and both image planes are representations of the same camera at different points in time and different positions in space, a conceptual plane exists, called the epipolar plane, that passes through $O_i$, $O_{i-1}$, $B_{b,\,i-1}$, and $B_{b,i}$. The epipolar plane intersects both image planes creating lines on the planes called the "epipolar lines". Another line, called the "baseline," passes through both optical centers $O_i$, $O_{i-1}$ and intersects both image planes. The points where the baseline intersects the image planes are called the "epipoles," in this example denoted as $e_{b,i-1}$ and $e_{b,i}$. The epipolar lines, therefore, are lines that start at the epipoles and pass through the image points which are located in the image planes. The net and important effect of epipolar geometry is that once the epipolar lines are known, the search for a corresponding point in the second image plane can be restricted to a search in the epipolar line, therefore the search can be much faster and more computationally efficient than if the search were conducted over the entire image plane.

In other words, if the positions in space of the camera at times i−1 and i are known, and the location of image point $B_{b,\,i-1}$ is also known, then the corresponding projection point $B_{b,\,i}$ can be found by searching along the epipolar line created when the plane defined by $\{e_{b,i-1}, e_{b,i}, B_{b,\,i-1}\}$ crosses image plane $I_i$. Epipolar geometry provides the tools by which these seemingly complicated calculations can be automated via proper computer algorithms.

Active triangulation is the triangulation of depth (a position in 3D space with respect to reference locations) using a camera and a beam projected by a light source such as a laser. The dot formed by reflection of the beam on a point in the scene is easily detectable in the image. If the camera and beam positions and orientations are known, then the equations of the projection lines through the image point and through the laser can be calculated, and the position of the point in 3D can be calculated as the intersection of the two projection lines. Active triangulation resolves the problem common to stereoscopic triangulation (passive triangulation) of finding landmark points in images. By providing an easily detectable image point, detection effectiveness and accuracy is improved.

A conventional digital video camera includes an imaging sensor, an A/D converter, and preprocessing devices. The imaging sensor is commonly a solid-state pixel array that produces an electrical signal output representative of the scene view. The imaging sensor polls each pixel in an ordered fashion and extracts analog voltage output proportional to the intensity of the incident light. The measured pixel value, which is proportional to the incident light intensity, is called the "intensity" of the pixel. Typical pixel arrays include, for example, charged coupled device (CCD) and CMOS pixel arrays. The combined information extracted from polling the array once constitutes a frame of a scene. Each time the array is polled another frame is created. A consecutive sequence of frames is referred to herein as video.

An encoder is a device configured to reversibly transform video from one format to another. Encoding to standard formats is desirable for various reasons, such as for example enhancing connectivity flexibility or increasing transmission rate capacity. A typical encoding format for transferring digital data is the IEEE 1394 format. The IEEE 1394 standard is commercially known as "Firewire" and also as "iLink." A reception device must contain a decoder capable of extracting the video content from the transmitted data.

An analog camera may also be used. An analog camera may generate an analog signal or may record video onto a recording device such as videotape. Analog video may be transferred to a computer directly using a video cable or indirectly using a videotape.

Before it can be used in modeling, analog video must be transformed into digital video. Transformation can be accomplished using commonly available analog-to-digital video converters.

While there are performance differences between digital video cameras and analog video cameras, these differences are a matter of design choice and a person skilled in the art will know how to implement the present invention as described herein with a design appropriate for the skilled person's needs.

Figure 2:
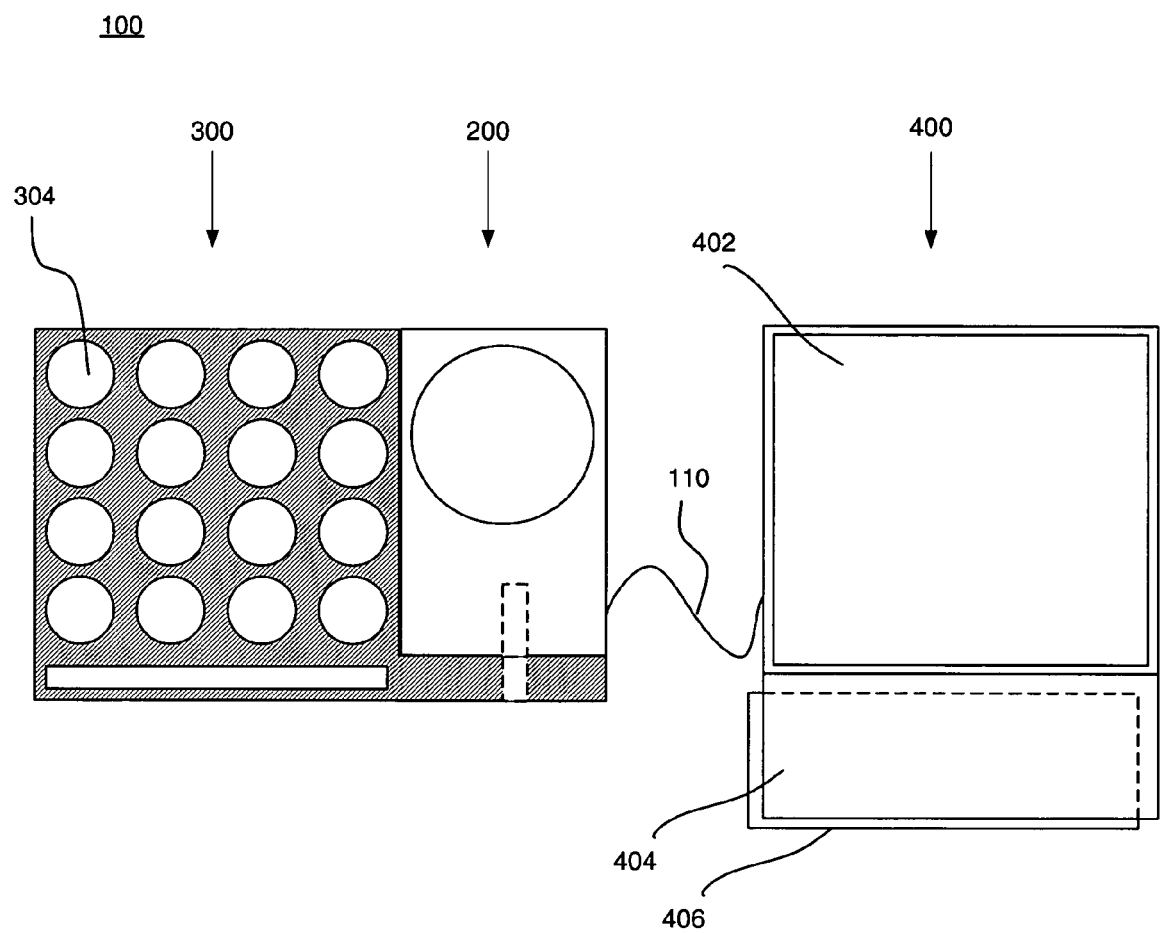
FIG. 2 is a block diagram showing a ModelCamera according to the invention.
Figure 3:
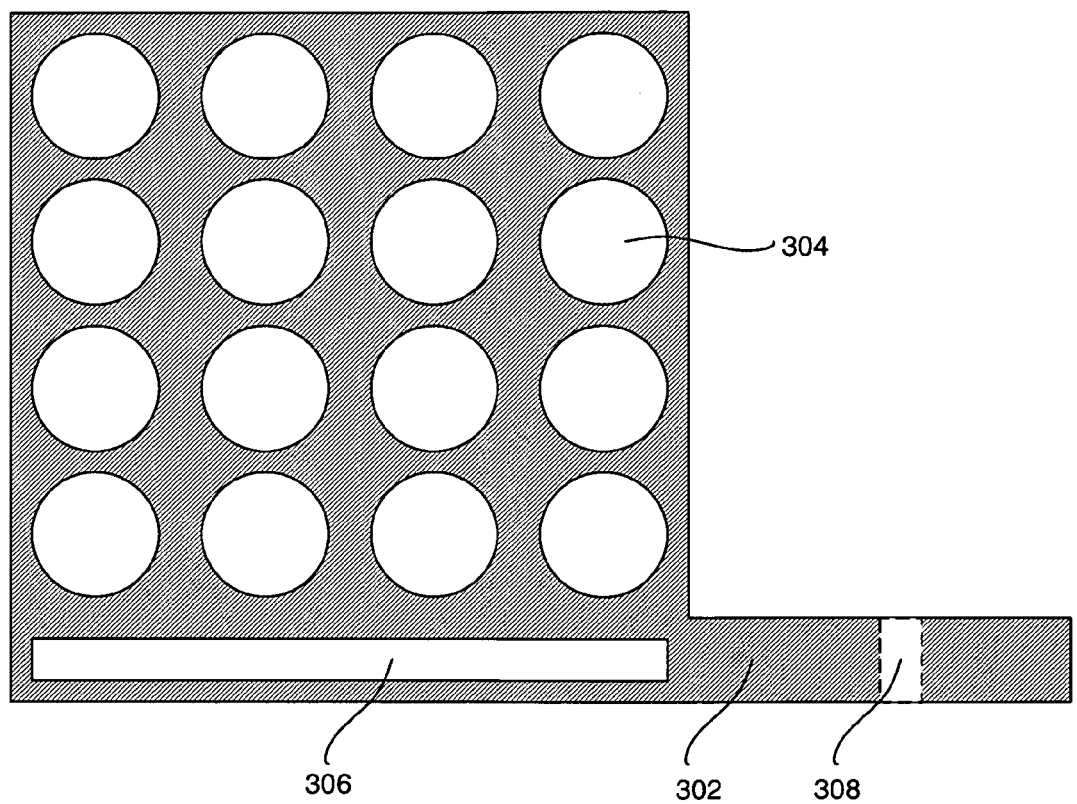
FIG. 3 is a block diagram showing one embodiment of a frame.

Referring now to FIG. 2, an exemplary block diagram of ModelCamera 100 according to the invention is shown. ModelCamera 100 includes video camera 200, frame 300, plurality of light projectors 304, data transmission device 110, and computer 400. The light projectors 304 can be on one side of the camera 200, or alternatively the light projectors 304 can surround multiple sides or all sides of the camera 200. The camera 200 and the plurality of projectors 304 are fixedly mounted on frame 300 such that the fixed relationship between the orientation of camera 200 and the orientation of each of beams projected by projectors 304 may be determined.

In one embodiment, independent light projectors are used which are capable of generating their own light. For example, each independent projector 304 may include an LED and a power supply providing power to the LED. A single power supply may be used to provide power to the plurality of LED's.

In an alternative embodiment, a single light source can be used, and the beam from the light source split using a beam splitter to generate a plurality of beam projections.

Figure 4:
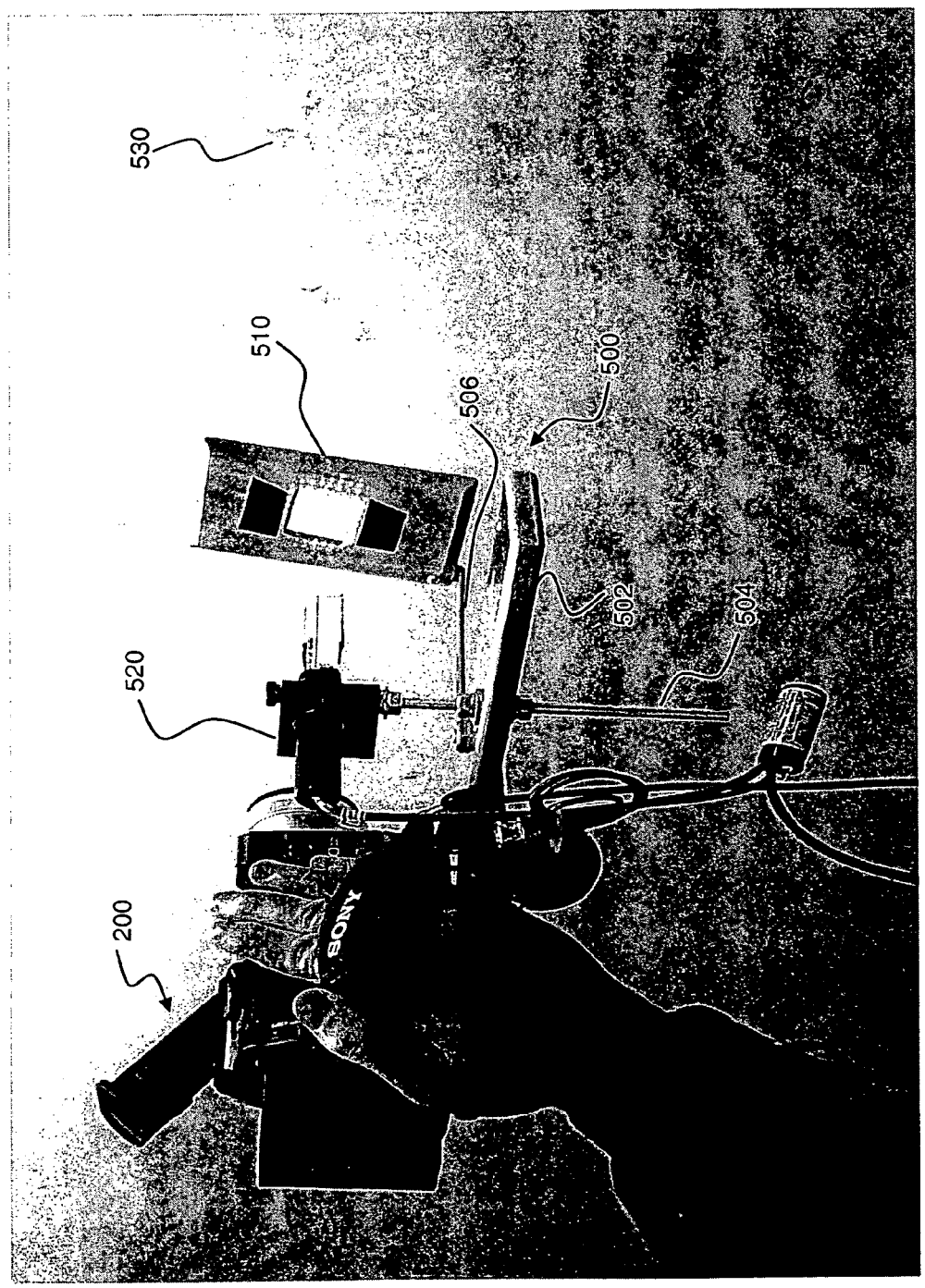
FIG. 4 shows one embodiment of a ModelCamera projecting a matrix of dots on a wall.

FIG. 4 shows a preferred embodiments of the invention including a camera 200, a diffraction grating lens 510 and a laser projector 520 fixedly attached to a common frame 500. The figure shows the camera 200 attached to a horizontal plate 502 which is attached to a threaded rod 504 passing vertically through the horizontal plate 502 to position the laser beam projector 520. The diffraction grating 510 is attached to the horizontal plate 502 by a horizontal rod 506. The diffraction grating lens 510 is used to split the laser beam into a plurality of projected beams. The right hand portion of the figure shows a portion of a 7×7 array of dots 530 that are projected by the laser beam projector 520 through the diffraction grating 510. The diffraction grating 510 is fixedly mounted to camera 200 by means of the frame 500 to create a fixed relationship between the orientation of camera 200 and the orientation of each of beams projected through the diffraction grating 510. The relative orientation of the camera 200 and the diffraction grating 510 is empirically determined to make the epipolar segments of the beams disjoint which prevents ambiguity in the assignment of beams to dots. An advantage of the diffraction grating is that the positions and orientations of the plurality of beams projected through the diffraction grating lens are fixed relative to each other by the construction of the lens and therefore the beams do not move relative to each other.

Figure 5:
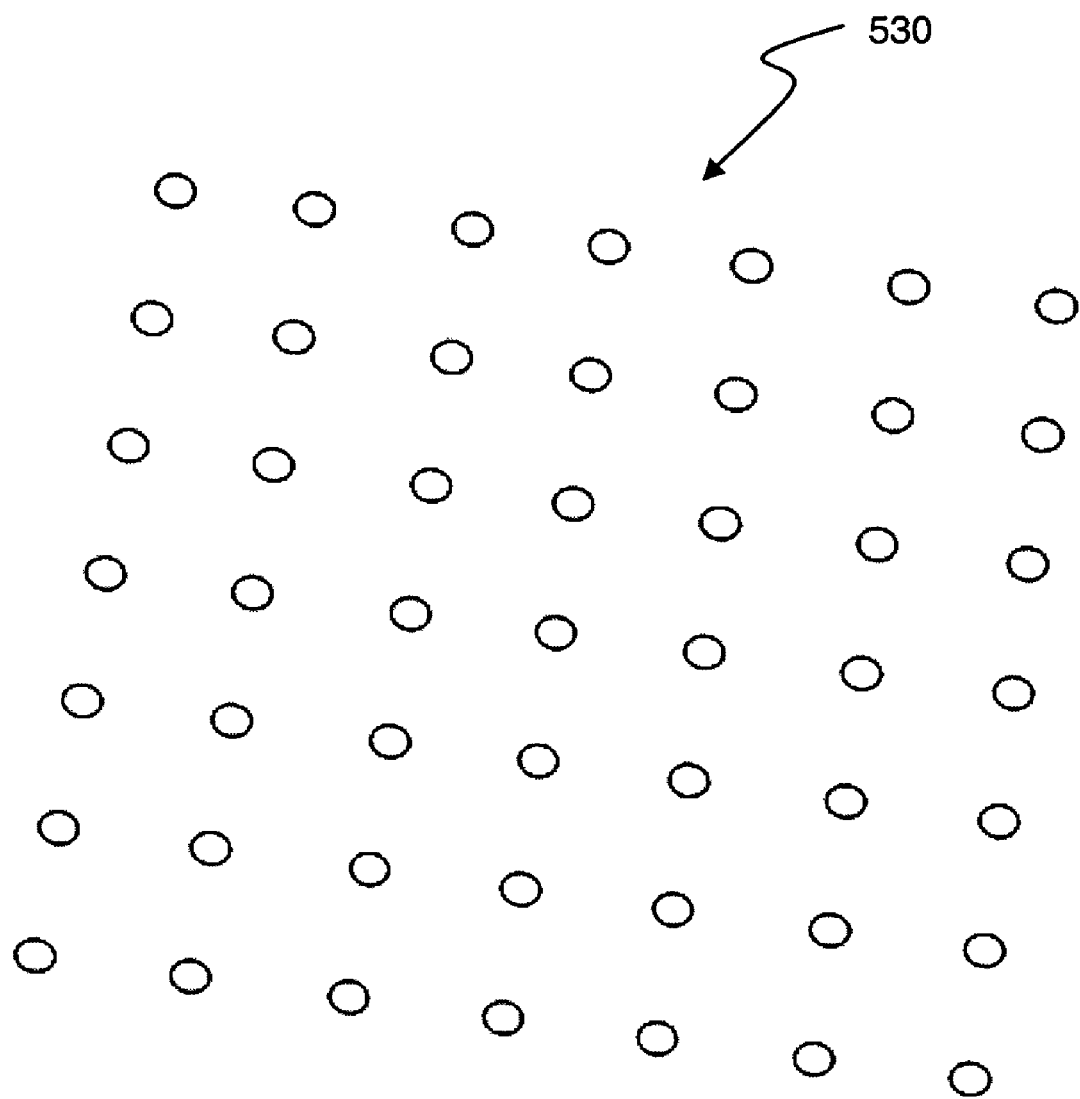
FIG. 5 is a schematic of a matrix of dots projected by the ModelCamera.

FIG. 5 shows a schematic representation of the 7×7 array of dots 530 projected by the embodiment in FIG. 4. Note that the horizontal and vertical distances between dots are proportional. The distances are not necessarily equal because the beams may not be completely parallel. As the camera 200 moves away from the wall the distances between dots will increase. The proportional distances between the dots will also change as the camera 200 is tilted.

Camera 200 and frame 300 may be fixedly yet removably mounted using a screw, latch, quick-disconnect, or any other suitable attachment device. Camera 200 may also include an optical viewfinder, a display such as a liquid crystal display (LCD), and various devices such as On/Off switches and control buttons well known to a person skilled in the art.

Data transmission device 110, shown in FIG. 1 as a tangible device, may be tangible, such as a cable (including metal and fiber optic cables) or intangible, such as a wireless connection using 802.11, Bluetooth or other technology using radio, laser or infrared signals. Suitable encoding and decoding devices for performing data transmission are incorporated in camera 200 and computer 400.

Computer 400 includes display 402, input device 404, and processing unit 406. Input device 404 may be a keyboard, microphone with speech recognition system, or optionally may be combined with display 402 in the form of a touch-sensitive display. Processing unit 406 includes memory, which can include random access memory (RAM) and high-capacity memory such as a hard-disk, suitable encoding and decoding devices for transmitting data to and from camera 200, modeling software and various algorithms for performing various functions (described below).

While display 402 is shown as a component of computer 400, display 402 may also be a component of camera 200. In the former embodiment, display data generated by processing unit 406 is transmitted to display 402 by conventional means. In the latter embodiment, display data generated by processing unit 406 is transmitted via data transmission device 110 to camera 200 which is adapted to display incoming computer data rather than data generated by camera 200 as would conventionally be the case.

Display 402 may also be a wearable display coupled to a wearable computer.

In one embodiment, the ModelCamera is constructed as a single unit including camera 200, computer 400, display 402. The diffraction gradient lens may be incorporated into the camera 200 or attached to permit use of different lenses, for example lenses creating more, or fewer, projected dots.

Calibration

Before modeling can begin, the ModelCamera is calibrated to measure intrinsic features of the video camera, to define each beam's epipolar line, and to characterize each beam's position and orientation relative to the camera. In addition to the ModelCamera, a white wall and a calibration target are used to maximize calibration precision. The calibration target may be a board containing a plurality of target indicia that establish a pattern of points and/or geometric relationships. Alternatively, the calibration target may be a grid projected onto a wall.

A conceptual pin-hole camera model has been used to describe the various functions of the camera. As a result, discussion of various defects and variations in camera construction has been avoided. These variations are real and distort the image. While the distortions may be minor and irrelevant in the normal use of the camera (i.e., movie-making), the distortions become relevant in the context of accurate measurement and modeling. The pin-hole model is therefore an approximation of the real camera projection that enables simple mathematical formulation of the relationship between the camera and the scene. This approximation can be improved with correction factors that compensate for the intrinsic features of the camera. Intrinsic feature corrections are typically provided for radial lens distortion, decentering distortion, thin prism distortion, etc. Correction algorithms are available in the public domain that create transformation parameters that can be applied to the frame data to undistort the frames so that they more accurately represent the scene. One commonly used set of algorithms, called "Camera Calibration Toolbox for MatLab®" was developed by Jean-Yves Bouguet and is available in Intel's OpenCV library.

Calibration may be performed using Bouguet's toolkit which includes the calibration procedure and algorithms that create the correction parameters. In Bouguet's procedure, video is first captured while the camera moves towards the checkered calibration board. Calibration frames from the calibration video are provided to the calibration algorithm.

The algorithm guides the user through a number of steps including a step to extract grid corners from the frames, optionally enter calibration parameter estimates manually, and finally, the instruction to calculate the intrinsic correction parameters. To extract grid corners, the algorithm first shows a frame on the display with an image of the board, then it prompts the user to extract the four extreme corners of the board by pointing to them in order using a typical input device such as a mouse or keyboard. The algorithm counts all of the squares in the board, calculates correction factors, and uses them to display a prediction of the image of the board superimposed on the image of the board. The prediction will include all of the squares on the board, not just the four corners. At this point, if the prediction does not overlay sufficiently on the image, the user may input correction coefficients to try and improve the prediction. Each additional frame is displayed in turn so that its corners can be extracted and correction coefficients can be calculated for each frame.

Next, the algorithm calculates final correction parameters by averaging the parameters calculated for each frame. The correction parameters are then used to undistort captured video frames thereby increasing the quality of the 3D model. Alternatively, the procedure can be simplified by using automated corner extraction algorithms which are also available in Intel's OpenCV library. In the simplified procedure, video frames are provided to the computer, and the computer automatically produces correction parameters. A calibrated camera is a "direction sensor," able to measure the direction of camera rays.

When a projection grid is used to calibrate the ModelCamera, special care is taken to eliminate the interference between the projected grid and the projected beams. Interference is eliminated by sequentially capturing video of the wall with the projected grid and then the beams projected on the wall without moving the camera. When the grid is projected the beams are turned off to prevent interference, and when the beams are projected the grid is turned off. After both sets of images are captured, the camera is moved to another position and the sequence is repeated. The grid and beam images at each camera position are correlated, or overlaid one on top of the other, to enable calibration as previously described.

The correction parameters characterize the camera and can be saved in computer memory, therefore it is not necessary that the computer used for intrinsic calibration purposes be the same computer used for modeling. If different computers are used, then the correction parameters calculated by one computer must be transferred to the modeling computer for use by it. Analogously, if the camera is moved with respect to the frame, the correction parameters will not be affected.

The camera image plane is an imaginary plane where the image is formed. A scene point P is imaged by intersecting the line defined by P and the center of projection of the camera (COP) with the image plane. A camera ray is a line that passes through the COP and is in the field of view of the camera. The field of view of the camera is the solid angle (or subset of possible directions emanating from the COP) that is sampled (imaged) by the camera. The field of view is a construction parameter, fixed for the zoom-less cameras, and variable for the cameras with zoom. The principal point is the point obtained by normal projection of the COP onto the image plane.

An epipolar line is the projection of a beam onto the camera image plane and is calculated empirically. The epipolar line's orientation in the camera's coordinate system is constant for each CameraModel configuration but will change if the relationship between the camera and the beam is changed, in which case the calibration performed to identify the epipolar lines for each beam must be repeated. Epipolar lines are determined from a sequence of frames captured while the camera views a wall. First, dots are detected on each frame and their position coordinates are calculated, then the position coordinates of each dot in every frame corresponding to a particular beam are least-squares fitted to define an epipolar line for the particular beam. In this manner, an epipolar line is defined for each beam of the ModelCamera. Preferably, about 200 frames are used to define epipolar lines.

To improve dot detection efficiency, epipolar lines may be clipped to reduce the potential search space where a dot may be found. In theory, the epipolar lines extend to infinity, but in reality the knowledge that the lines extend to infinity is not useful. In fact, the only interesting information about an epipolar line is in the portion of the line that exists within the camera's view. Clipping is made possible by defining a depth of view range, and then using the range to clip each epipolar line. The clipped lines are called "epipolar segments." In a typical scene, the epipolar lines are clipped to correspond to a depth of view from 0.5 meters to 3.5 meters. The clip range may be changed depending on the circumstances. For scenes with a significant amount of detail, the range may be narrowed to improve detection robustness. For a large scene containing distinct simple objects the range may be widened. The clip range is preset in the detection algorithm, but is also capable of modification by the user.

The dot detection procedure used to define epipolar lines differs from the more effective dot detection procedure used in the modeling process in that epipolar lines have not yet been defined when the step to define epipolar lines is carried out. In the dot detection procedure to define epipolar lines, the dots are found by an exhaustive search for intensity peaks in the entire frame. The frame is filtered to reduce white noise, then the intensity threshold is adjusted until a plurality of dots corresponding to the plurality of beams are found in the frame. The intensity threshold is found by trial-and-error search. If the intensity level is too low, the number of dots detected exceeds the number of beams, due to bright scene points that pass the threshold. If the intensity level is too high, the number of dots detected is lower than the number of beams, because some dots are too dim to pass the threshold. The intensity threshold is decreased or increased until the correct number of dots is found. The dots are assigned to beams according to their horizontal and vertical ordering in the first video frame.

The beam equation parameters are determined from a sequence of frames in which the camera moves towards the calibration target. At each frame, the dots are detected on their respective epipolar lines using the algorithm described below, and the camera pose is inferred from the calibration target image (with the lasers turned off to prevent interference if a projected grid is used) using Bouguet's toolkit. The 3D position of each dot is determined by intersecting the camera ray with the checkerboard plane. The position coordinates of every dot corresponding to a particular beam are least-squares fitted to define a beam equation. Ten frames may be preferably used to create a beam equation.

Structured and Unstructured Modeling

Scenes may be structured or unstructured. In structured scene modeling, the user moves the camera in any desired direction to capture video and depth samples of the scene. The video and depth samples are processed to generate a 3D model of the scene. Unstructured scenes, on the other hand, require use of a tripod. Both structured and unstructured scene modeling utilize the ModelCamera to acquire depth samples and for this reason they share image processing algorithms.

In unstructured scenes, the user pans and tilts the ModelCamera around the camera's center of projection to acquire video and depth samples of the scene. The ModelCamera is mounted on a tripod using a bracket that permits such motion. A video sequence is captured at a location and processed to produce a 3D model referred to as a depth enhanced panorama (DEP). If desired, the tripod and ModelCamera can be moved to a new location and another video sequence forming a DEP can be captured. The DEPs captured at subsequent locations can be combined with the current DEP to improve and augment the current DEP.

In a preferred embodiment, a method for 3D modeling using the ModelCamera is disclosed. In the preferred method, a user scans a scene and captures video with a calibrated ModelCamera. The beams produce dots where they intersect the scene surface and corresponding image dots in the video frames. The frames are transferred to a computer where the image dots are detected in the frames, the 3D positions of their corresponding dots are inferred by triangulation, and color data is obtained. Each additional frame is registered with respect to the previous frame using the depth and color data. The contribution of a new frame to the evolving 3D model is retained and the redundant information provided by the new frame is discarded. The contribution may be an additional portion of the scene or may be a replacement portion where replacement means the substitution of a portion of the model with an improved representation of the same area. The new contributions are rendered and the model is subsequently shown in the display. The method steps described herein are described in more detail in the following paragraphs.

Figure 6:
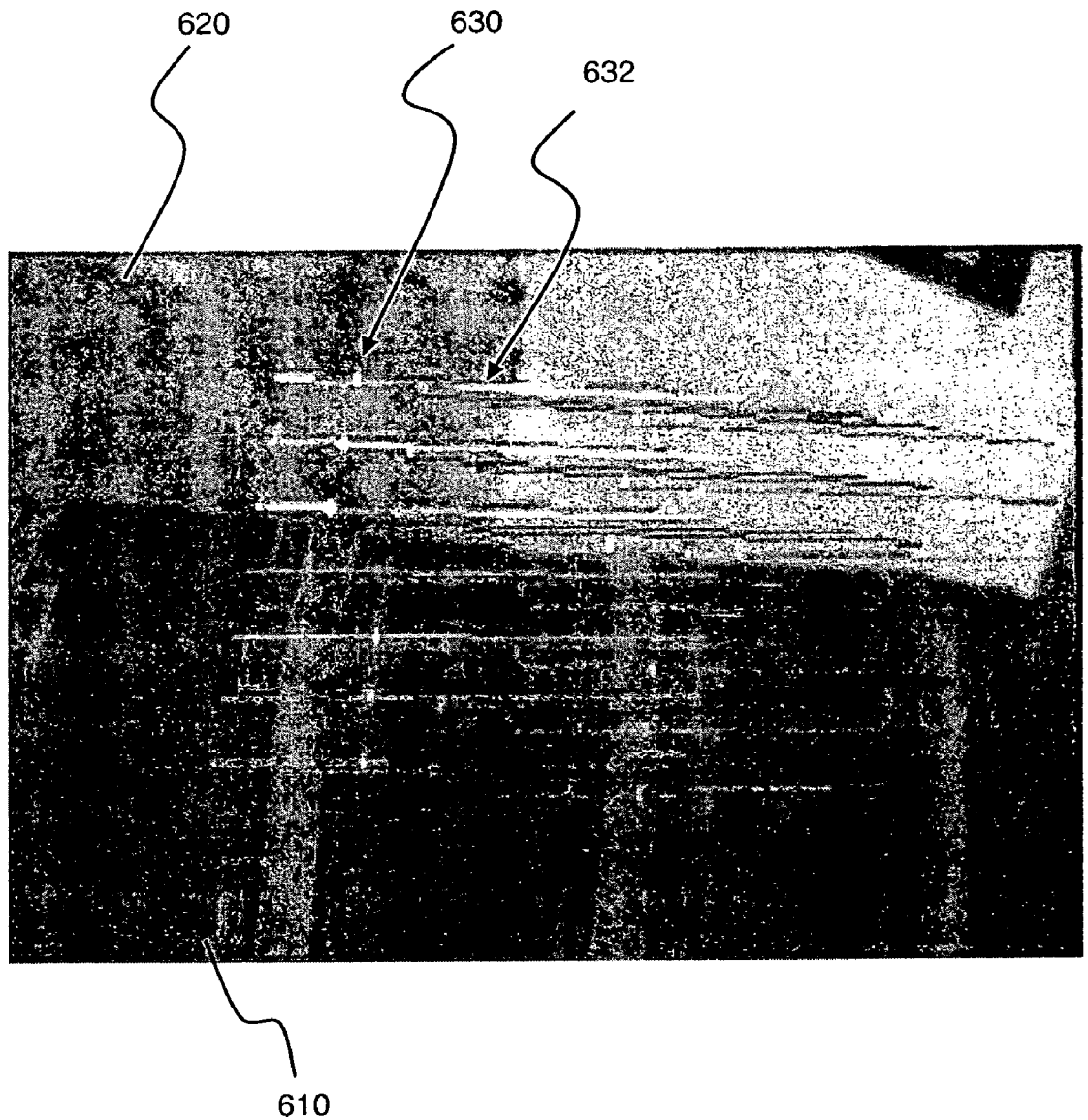
FIG. 6 is a projection of a dots on a first scene.
Figure 7:
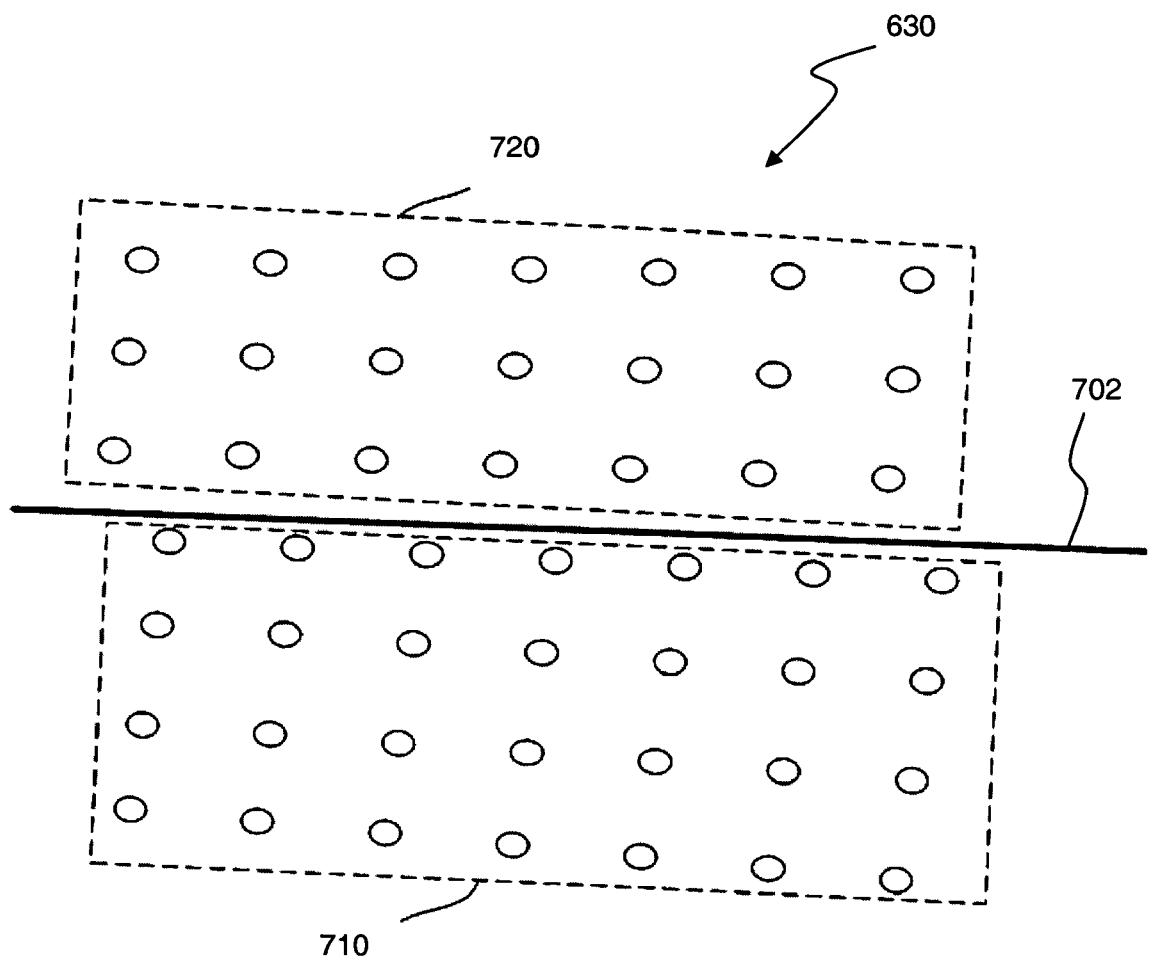
FIG. 7 is a schematic of the image in FIG. 6.

FIG. 6 shows an image as seen in the display 402. The image shows a sofa 610 positioned in front of a wall 620, a projected 7×7 array of dots 630, and a plurality of generally horizontal lines 632. Each of the generally horizontal lines crosses a dot. The lines are the epipolar segments and are created and displayed by the computer 400. Because the epipolar segments are disjoint they do not overlap. FIG. 7 shows a schematic representation of the 7×7 array of dots 630 projected by the ModelCamera on the scene in FIG. 6. A dark dividing line 702 represents the top edge of the sofa 610. The dividing line 702 divides the array of dots 630 into a first group 720 in which the dots fall on the wall 620 and a second group 710 in which the dots fall on the couch 610. Note how group 720 is displaced to the left of group 710. From the displacement of the dots in the group 710 from the dots in the group 720; and the fact that the relationship between dots within each group has not changed, the computer may infer several things, including that: (1) group 710 represents one surface and group 720 represents another surface; (2) the camera was not aimed perpendicularly to the sofa 620 but rather that it was aimed left of the sofa's normal; and (3) that the edge of the sofa 620 was parallel to the rectangular beam pattern 630. While this explanation is an oversimplification of the concepts exploited by the ModelCamera, they do illustrate its principles of operation.

Figure 8:
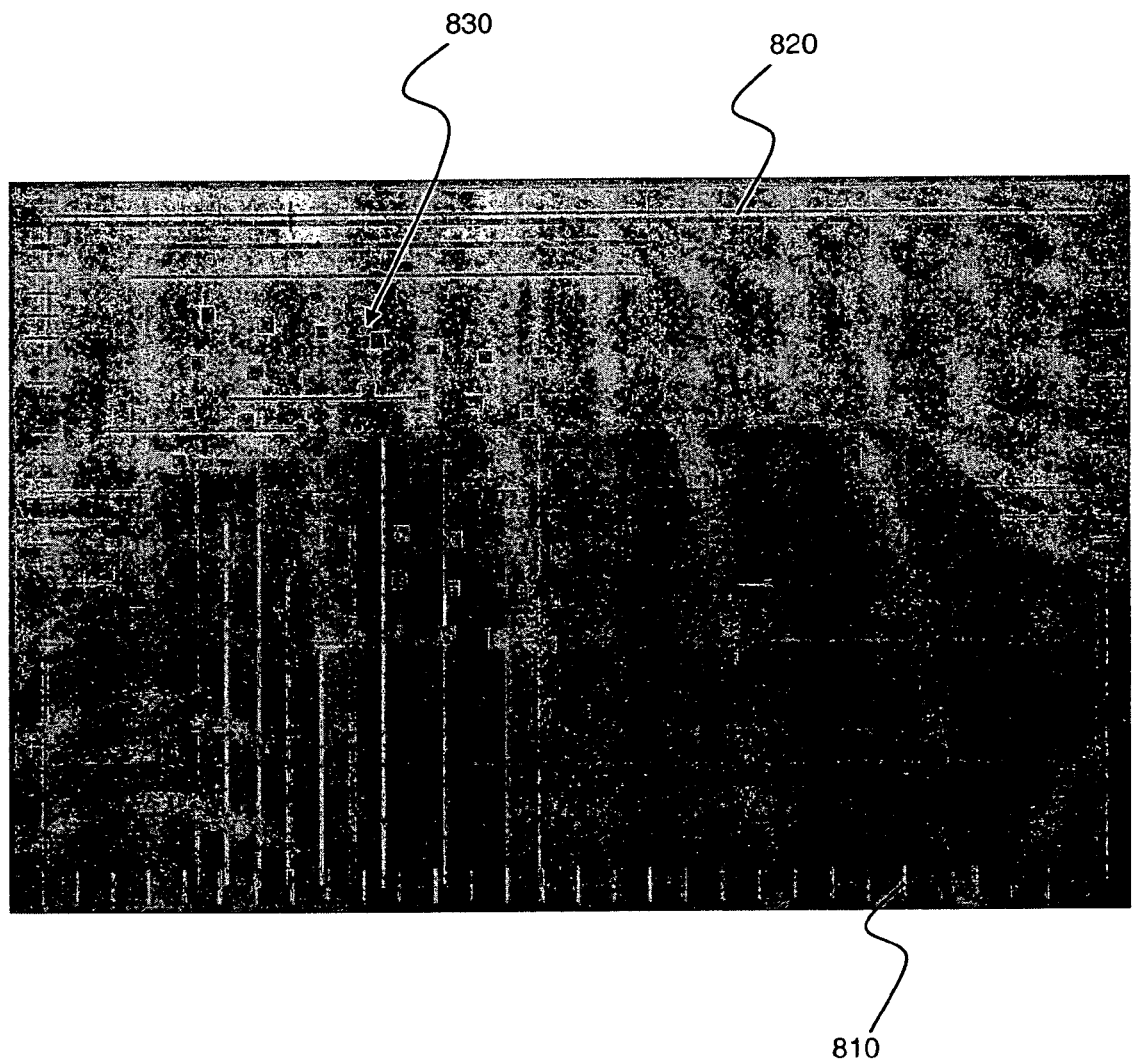
FIG. 8 is a projection of a dots on a second scene.
Figure 9:
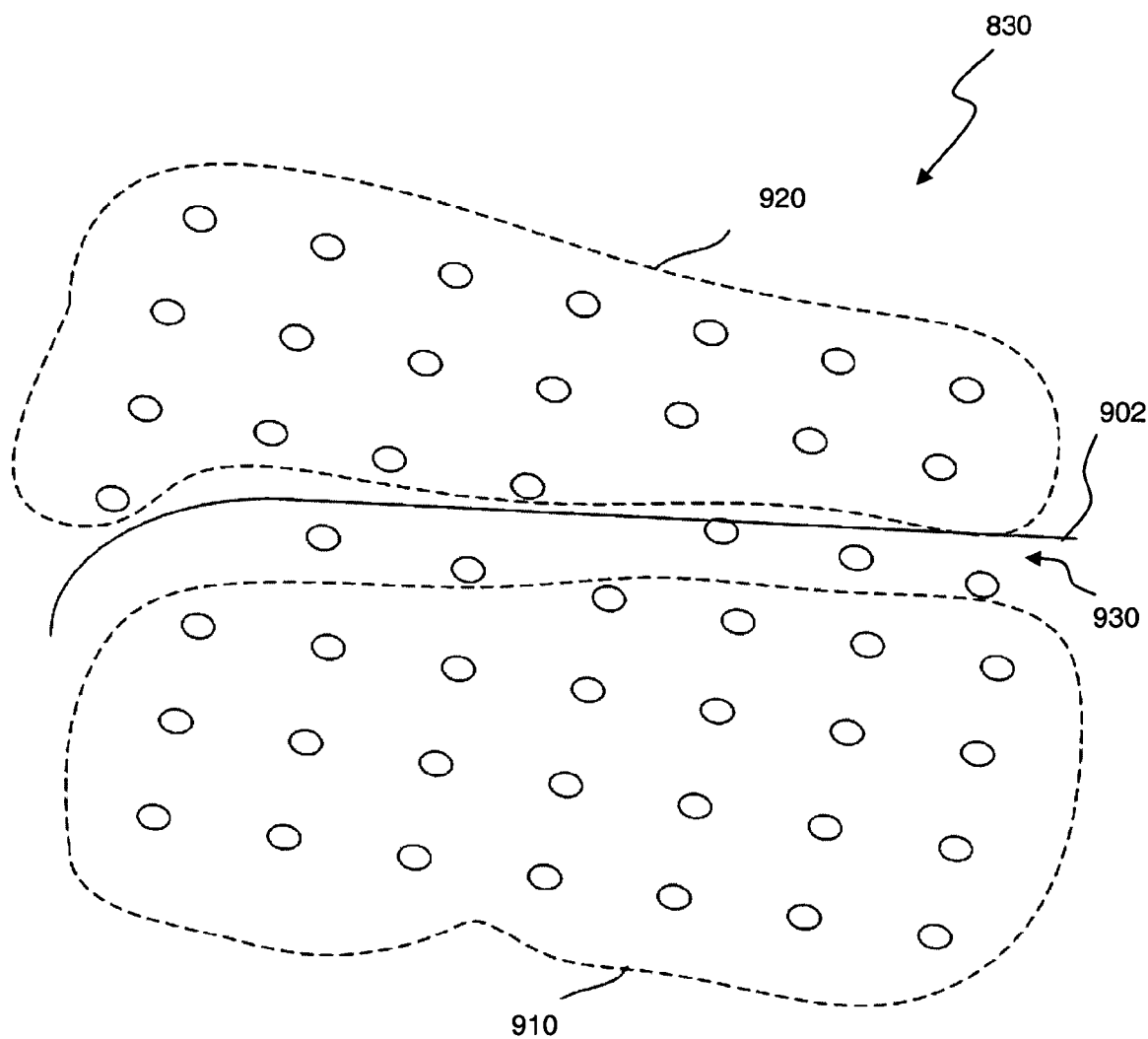
FIG. 9 is a schematic of the image in FIG. 8.

FIG. 8 shows another image as seen in the display 402. The image shows a chair 810 positioned in front of a wall 820, and a projected 7×7 array of dots 830. The dots were enlarged in software to make them more visible in the image. FIG. 9 shows a schematic representation of the 7×7 array of dots 830 projected by the ModelCamera on the scene shown in FIG. 8. A dividing line 902 represents the edge of the chair 810. The dividing line 902 divides the array of dots 630 into a first group 920 in which the dots fall on the wall 820 and a second group 910 in which the dots fall on the chair 810. Several lose dots 930 are located between groups 910 and 920 and do not fit the pattern of either group. Note how the first group 910 is displayed to the left of the second group 920, and that the pattern is not parallel to the edge of the chair 810. From the displacement of the dots in group 910 from the dots in group 920, and the fact that the relationship between dots within each group has not changed, the computer infers that group 910 represents one surface and that group 920 represents another surface. By fitting a quadratic equation to the lose dots 930 between groups 910 and 920 and the dots that touch the edges of groups 910 and 920 the computer may infer that a rounded surface divides the two substantially flat surfaces represented by groups 910 and 920.

Dot Detection

Frames are provided to the processing unit where frames are processed to detect image dots and quantize surface characteristics. The ModelCamera acquires one depth sample per dot per frame by finding the image dots on their epipolar segments and triangulating their 3D positions in camera coordinates. To find an image dot, the dot detector searches its epipolar segment for intensity peaks. Assuming a constant camera motion, an estimated dot position is calculated by calculating a dot motion corresponding to the camera motion and adding the dot motion to the dot position of the previous frame. The constant motion assumption is valid if the camera moves slowly, and starting the search at a position obtained by assuming constant motion is more efficient than starting a search at the previous dot position.

Figure 10:
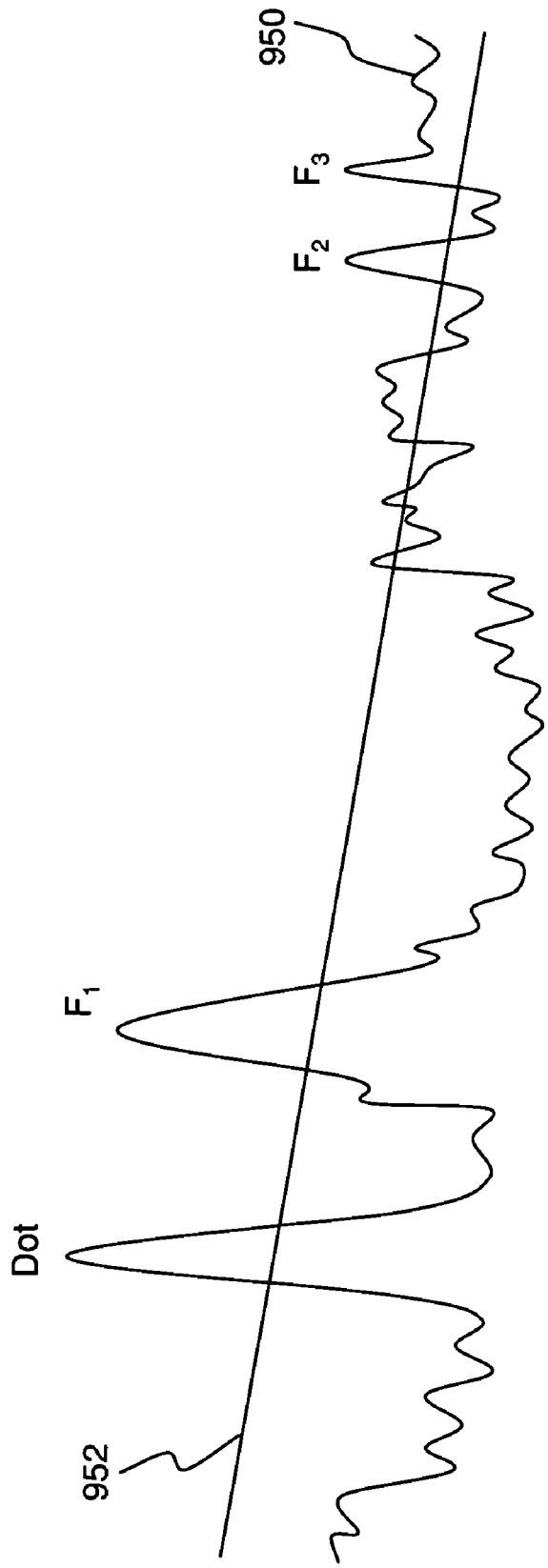
FIG. 10 is an intensity plot along an epipolar line.

The intensities are bi-linearly interpolated along the epipolar segment and are smoothed with a filter, for example a 1-D raised cosine filter. To qualify as a dot, an intensity peak must exceed a threshold which varies linearly along the epipolar segment to allow for dimmer dots at a distance. The intensity peak must also fall off rapidly on either side, and its surrounding bright region must be roughly circular along eight evenly spaced spokes centered at the peak. FIG. 10 shows intensity plot 950 along an epipolar segment and a threshold line 960 that decreases with distance of the dot from the source. In this example, four primary intensity peaks, Dot, F1, F2, and F3, exceed the threshold line 952. One or more of these peaks would be tested for symmetry to determine whether the intensity falls off in a roughly circular pattern along eight evenly spaced spokes centered at the peak. This is to prevent finding a false dot due to a bright ridge or edge in a scene. In this case the intensity peak labeled Dot is in fact an image dot. The search process is repeated to find the remaining dots.

If a surface exhibits a discontinuity, such as a fold or a corner, corresponding dots on consecutive frames may appear further apart than if the surface was continuous. In such cases, the entire epipolar segment is searched.

Detecting the dots robustly is crucial. The first priority is to avoid categorizing an intensity peak as a dot when it is not a dot (could simply be a reflection from a metal object, for example). False positives disrupt registration and severely distort the model. The reverse error, not categorizing an intensity peak as a dot when it is a dot (false negatives), is less critical if the number of dots exceeds the minimum number of dots required for registration. It is possible to miss a few dots and still successfully register the frames.

Depth accuracy is a function of dot detection accuracy. Dot detection accuracy is increased by super-sampling the epipolar segment four times per pixel. If the peak is flat (saturated to 255), the midpoint is used.

Registration

Before a frame can be added to the scene model, it has to be registered with respect to the prior frames. A frame contains color and depth information for a fragment of the scene. Registering the frames is equivalent to finding the position and orientation of each such scene fragment to form a consistent global scene model. The scene fragments acquired at each frame are equivalent to overlapping pieces of a 3D puzzle, and registration is the process of finding the position and orientation of each piece to properly fit the piece to the puzzle.

The registration algorithm, registers the consecutive frames. The registration modeling and visualization are preferably done differently according to whether the scene in structured or unstructured. In the case of structured scene modeling, a two stage algorithm can be used to register frames that is sufficiently fast and computationally economical to permit good registration by the ModelCamera in real-time. For unstructured scenes, it is preferable to use just the color registration.

The registration algorithm computes the position and orientation of frame k with respect to frame k+1. The position is represented by three variables and the orientation is represented by another three variables. The registration algorithm finds values for the six variables which produce a good color and depth match between frame k and frame k+1.

In the first stage, the algorithm achieves depth registration by matching the depth of frames k and k+1. For illustration purposes, modeling of an office scene will be described. The office scene contains a left and a right walls that meet at a corner. The left wall has a color poster on it. The scene also includes a computer monitor. Video is captured by moving the ModelCamera diagonally, both from left to right and simultaneously from far to near. At frame k+1 the camera is to the right and in front of the frame k position. Initially, the scene fragments captured by each of the frames are overlapping patches of the left wall. The first stage places the patch of frame k+1 flat on the patch of frame k, achieving depth registration.

Depth registration is achieved by searching for the position and orientation of frame k+1 that makes the 3D dots of frame k+1 lie on the scene fragment acquired at frame k. A depth error is defined as the sum of the distances from each 3D dot of frame k+1 to the scene fragment of frame k. The 3D dots of frame k+1 are translated and rotated until the depth error function is minimized.

In order to measure the distance from a dot of frame k+1 to the scene fragment acquired at frame k, the scene surfaces acquired at frame k are approximated by grouping the dots of frame k into surfaces and approximating the normals of each surface at each dot of frame k.

In the exemplary scene, all dots at frame k are part of the left wall surface. As the ModelCamera moves left to right, it views the corner of the room where two walls meet and the monitor. The 3D dots are then grouped according to the surfaces viewed by the camera. By design, the dots form a 2D array. Each row and column of 3D dots is examined for surface boundaries. The boundary can be a depth discontinuity, such as where the edge of a monitor ends and the wall behind it begins, or a depth derivative discontinuity, such as where two walls meet. Given n dots with depths $z_1, \ldots, z_n$, the second differences, $d_i = z_{i+2} - 2z_{i+1} + z_i$, are computed to approximate the curvature of the surface along the strip. A depth derivative discontinuity occurs between dots i and i+1 when the rate of change of the depth between dots i and i+1, expressed as $d_i$ and $d_{i+1}$, is greater than a threshold value. A depth discontinuity occurs when the difference of the depths of dots i and i+1 is greater than a threshold value. A dot connectivity graph is constructed by linking every dot to its left, right, bottom, and top neighbors and then breaking the links that span boundaries. Using a depth first traversal, the graph is partitioned into connected components that represent surfaces. An example of this was given in the simplified discussion of FIGS. 6-9.

The threshold values determine the resolution of the model and also impact registration speed. A default threshold value is defined in the software and may be subsequently changed by the user to adapt the modeling process to the particular scene. A preferred value for the threshold is 3.

Cubic polynomials $z = p(x, y)$ are least-squares fitted to the surfaces. The dots are mapped to surface points by perpendicular projection. The frame is rejected if the mean dot/point distance exceeds a threshold value. A preferred threshold value for frame rejection is a value that is twice the dot detection accuracy. If the frame is not rejected, the dots are assigned the surface normals of their surface points.

Depth registration is performed by formulating linearized depth equations and solving them by least squares. The depth equations state that the new dots lie on the surfaces of the corresponding old dots. An equation is formulated for an old/new dot pair when both dots have four surface neighbors, which indicates that they are interior to the surface. Dots on surface boundaries are skipped because their normals can be inaccurate. The old surface is linearized as $n(p-a)=0$, where n is the surface normal, p is the new dot, and a is the old dot. Linearizing the old surface means approximating the old surface by assuming that the surface normal at each dot does not change much in the vicinity of the dot. The user moves the ModelCamera slowly enough, and the frame rate is high enough, such that the dots of the new frame are sufficiently close to the dots in the old frame such that this approximation holds. Depth registration places each dot of the new frame as close as possible to the plane tangent to the old surface at the corresponding dot in the old frame.

The motion is $m(p)=t+Rp$ where t is a translation vector and R is a rotation matrix around an axis d by angle $\theta$. The motion is linearized as $m(p)=t+p+r*p$, where $r=\theta d$, and then is substituted into the linearized surface equation to obtain the depth equation $tn+r(p \times n)=n(a-p)$. The k depth equations form a system $Ax=b$ where A is a k-by-6 matrix, $x=(tx, ty, tz, rx, ry, rz)$ is a 6 elements vector, and b is a k elements vector. The six elements of the vector x represent the translation of the camera along the x, y and z axes and the rotation of the camera around the x, y and z axes.

A least-squares solution is an x that minimizes the geometric mean distance from the transformed dots to the surfaces. A generic system has a unique solution when $k \geq 6$, which holds in structured scenes. But symmetric surfaces lead to non-generic equations that have multiple solutions. A surface is symmetric when it is invariant under translation along an axis, rotation around an axis, or coupled translation and rotation. Examples are planes, surfaces of extrusion, surfaces of rotation, and spheres. In a symmetric surface, the distance from the dots to the symmetric surface is constant when the camera performs these motions.

Depending on the scene, depth registration may identify three or more motion variables. Algorithms may be written that utilize depth information to identify the maximum number of motion variables obtainable from a scene, for example three, four or five variables may be obtained. The advantage of identifying more than three variables is that the second stage—color registration—is simplified if fewer variables must be quantified and this increases the registration speed of the particular frame. For example, for a case in which the ModelCamera is scanning a scene comprising three flat walls arranged like a corner, the ModelCamera always has a few dots on each of the flat walls, allowing for complete registration using only depth registration.

In practice, many scenes will not yield more than three variables. It is therefore not critical to accelerate an algorithm identifying more than three variables during depth registration. For this reason, it may be practical to use an approach in which depth registration identifies only three variables and color registration identifies the remaining three variables. Either approach is feasible and the selection of one approach over the other is a matter of design choice. For simplicity, the case where depth registration is limited to three variables is described.

Any normal vector to a surface generates three asymmetric motions: translation along it and rotation around two perpendicular axes. A proof is obtained by checking the finite list of symmetric surfaces. The normal at the centroid of the old dots is computed and the depth equations are formulated in a coordinate system where the normal is the z axis. Thus, tx, ty, and rz of the camera motion vector $x=(tx, ty, tz, rx, ry, rz)$ are possibly symmetric, while elements tz, rx, and ry are always asymmetric. The symmetric elements of the x vector are dropped from the depth equations and the equations are solved by singular value decomposition to determine the value of the remaining variables.

In the example discussed above where the ModelCamera scans a wall from left to right and from near to far, depth registration determines values for the translation motion perpendicular to the wall and the two rotations about two perpendicular axes contained in the wall. In other words, depth registration finds how much closer the ModelCamera got to the wall and how much it rotated left-right and up-down. Depth registration cannot measure how much the ModelCamera slid sideways nor how much it rotated about an axis perpendicular to the wall. These remaining three degrees of freedom (two translations parallel to the wall and rotation about the wall's normal) are found in the second stage of the registration algorithm using color. Using the notation introduced in the previous paragraphs, the remaining three degrees of freedom correspond to tx, ty (translations parallel to the wall), and to rz (rotation about the wall's normal).

Color Registration

The second stage, called color registration, computes the camera motions that do not produce a depth error change and thus could not be computed during the first stage (depth registration). The best values for these motions are found such that the color of frame k+1 matches the color of frame k. In the case of the ModelCamera scanning a wall with a poster, the 2 translations parallel to the wall and rotation about the wall's normal are computed such that the piece of the poster seen at frame k matches the piece of the poster seen at frame k+1.

Color registration is performed by searching for the values of the remaining camera motions that minimize a color error. The color error at one pixel in frame k+1 is defined as the squared difference between its color and the color of the frame k pixel to which it maps.

For efficiency, only a subset of the pixels of frame k+1 are be used. The pixels are selected from evenly spaced horizontal and vertical segments in frame k+1, from the region covered by the dots. The color error of a set of pixels is defined as the sum of the color errors of each pixel.

A pixel of frame k+1 is mapped to frame k by projection, for which the depth at the pixel is needed. Frame k+1 measured depth at the dots. The depth in between dots is computed by connecting 4 neighboring dots with 2 triangles. The triangle mesh provides a depth measurement for each pixel of frame k+1, located in the region of the dots.

Figure 11:
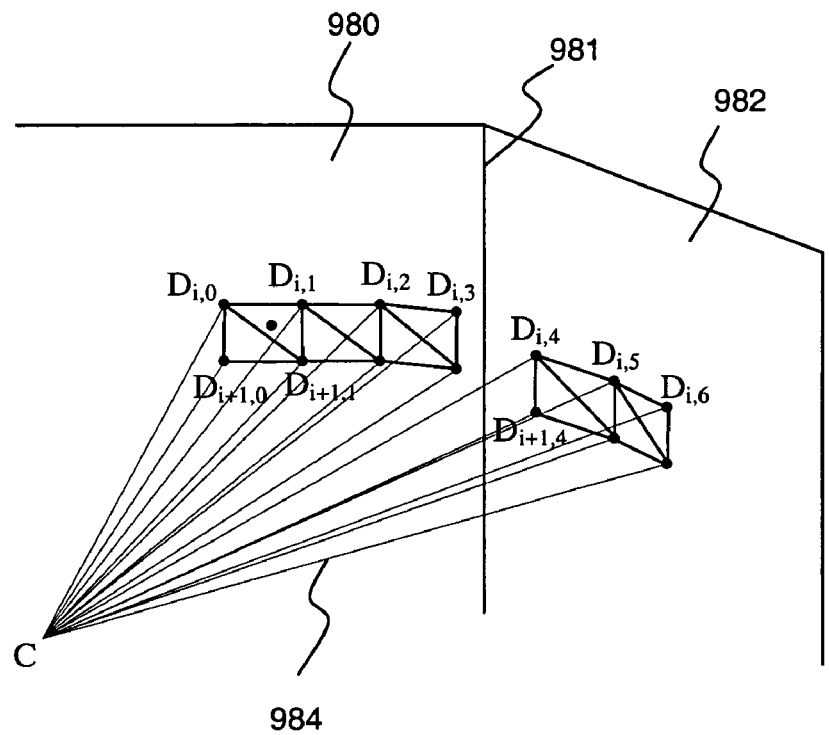
FIG. 11 shows dots projected on two walls.
Figure 12:
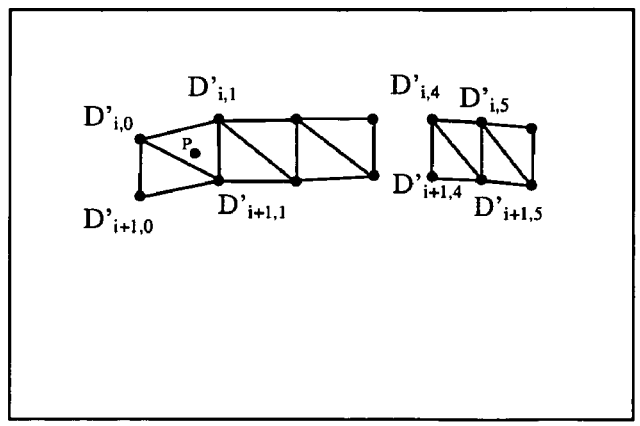
FIG. 12 shows an image of the dots in FIG. 11.

FIG. 11 and 12 shows a schematic of the image from ModelCamera scanning two walls 980 and 982 that meet at an edge 981. The ModelCamera is positioned at point C and two rows of laser dots ($D_i$ and $D_{i+1}$) are captured in the image. C is the center of the lens or the center of projection. The lines 984 connecting the center of projection C with the dots are camera rays that pass through the center of the laser dots. FIG. 12 shows the frame captured by the ModelCamera. Neighboring dots that are on different walls are not connected (e.g. dots $D_{i,3}$ and $D_{i,4}$). Four neighboring dots that are on the same wall are connected with two triangles (e.g. $D_{i,0}$, $D_{i,1}$, $D_{i+1,0}$, and $D_{i+1,1}$). The triangle mesh allows approximating the depth at any pixel in between the dots using the triangle that covers it. For example the depth of pixel P in FIG. 12 is computed using the triangle $D_{i,0}$, $D_{i,1}$, $D_{i+1,1}$.

The location $(U_k, V_k)$ in frame k where pixel $(U_{k+1}, V_{k+1})$ of frame k+1 projects can be computed according to the following projection expressions:

$$u_k(u_{k+1}, v_{k+1}) = \frac{A_0 u_{k+1} + B_0 v_{k+1} + C_0 d(u_{k+1}, v_{k+1}) + D_0}{A_2 u_{k+1} + B_2 v_{k+1} + C_2 d(u_{k+1}, v_{k+1}) + D_2}$$

$$v_k(u_{k+1}, v_{k+1}) = \frac{A_1 u_{k+1} + B_1 v_{k+1} + C_1 d(u_{k+1}, v_{k+1}) + D_1}{A_2 u_{k+1} + B_2 v_{k+1} + C_2 d(u_{k+1}, v_{k+1}) + D_2}$$

The numbers $A_i$, $B_i$, $C_i$, and $D_i$ are per frame constants (they do not depend on the pixel coordinates (u, v)). d(u, v) is a measure of the depth at pixel (u, v), as approximated using the triangle mesh described above. When a horizontal segment of pixels is projected, the projection expressions for pixel $(u_k+1, v_k)$ can be computed by reusing the expressions of pixel (Uk, Vk) at the cost of 3 adds ($+A_i$), 1 divide (the inversion of the common denominator), and 5 multiplies ($C_i$d and the two multiplies with the inverse of the common denominator). Processing a vertical segment has the same per pixel amortized cost of 3 adds, 5 multiplies, and 1 divide (the $+A_i$ adds are replaced with $+B_i$ adds).

In the case when the surfaces acquired by the ModelCamera are planar, a pixel of frame k+1 can be projected more efficiently to frame k. One solution is to use projective texture mapping, according to the equations below, which can be evaluated with an amortized per pixel cost of 3 adds, 2 multiplies, and 1 divide:

$$u_k(u_{k+1}, v_{k+1}) = \frac{A_0 u_{k+1} + B_0 v_{k+1} + C_0}{A_2 u_{k+1} + B_2 v_{k+1} + C_2}$$

$$v_k(u_{k+1}, v_{k+1}) = \frac{A_1 u_{k+1} + B_1 v_{k+1} + C_1}{A_2 u_{k+1} + B_2 v_{k+1} + C_2}$$

Another solution is to project both frames k and k+1 to an orthographic grid first, in which case a pixel from frame k+1 can be projected to frame k with two adds.

Because small camera motions produce rapid and erratic changes in color values, the relevant region is convolved with a box filter. This is done efficiently by computing the convolution sum incrementally: for each pixel the sum of the least recent filter column is replaced with the sum of the new column. The color error function is then minimized using the downhill simplex method.

Incremental Modeling

After registration, the scene fragments acquired by every frame are placed in a common global coordinate system. The registered scene fragments can be used directly to render the scene from a novel viewpoint, and are thus a possible model of the scene. However, because each scene fragment overlaps the previously acquired fragment, the model is highly redundant. Redundancy degrades computational speed and model quality. Computational speed degrades because a part of the scene is unnecessarily rendered several times. Quality degrades because the model retains the part of the scene acquired by the last frame even when a previous frame acquired a better image of the part of the scene.

Incremental modeling optimizes computational performance and model quality by eliminating redundancy. The incremental modeling algorithm processes each incoming frame to distinguish the portion of the incoming frame that is redundant (meaning that it is already in the model) from the portion of the incoming frame that acquires a new portion of the scene (meaning a portion that was not acquired by any of the previous frames). The incremental modeling algorithm then compares the redundant portion of the incoming frame to the equivalent portion in the model, determines which of the two versions is of better quality, incorporates the version with better quality into the model, and discards the other version. The model is thus improved for that particular part of the scene. The algorithm also incorporates into the model the portion of the incoming frame that acquired a new portion of the scene.

In the case of the ModelCamera scanning a wall with a poster by moving left to right and also moving closer to the wall, the right edge of the new frame sees a new piece of the wall and that is added to the model. The left part of the new frame sees a piece of the wall that was already acquired. The system must determine whether to keep the left part of the new frame by swapping it with the equivalent part in the model and then discarding the part that was in the model, or to discard the left part of the new frame because its quality is inferior to the equivalent part that is already in the model.

Camera sampling rate is used as a quality metric for comparing two versions of an image representing a portion of a scene. Sampling rate is the ratio of the number of pixels in a frame to the area of the scene represented by the frame. For example, a camera located close to the scene will acquire a small area of the scene and therefore the sampling rate will be high. As the camera moves away from the scene, the same number of pixels (fixed by the camera's construction) will represent a much larger area of the scene, and therefore the sampling rate will be low. In other words, sampling rate represents how many pixels are used to describe a fixed scene area, with more pixels equating a higher sampling rate and less pixels equating a lower sampling rate. It follows that higher sampling rate is not always better. If the camera is too close to the scene, the scene is oversampled. If the camera is too far away from the scene, the scene is undersampled. An oversampled frame is of lower quality even though it is of higher sampling rate. What constitutes oversampling depends on the scene and the modeling needs of the user. The modeling algorithm may be programmed with a desirable sampling rate, also modifiable by the user, which the algorithm may use to compare the redundant portion of an incoming frame to the equivalent portion in the model and to determine which of the two versions to keep and which to discard. By operating without a target sampling rate or setting a desired sampling rate, the user may control the system to prefer portions of frames with higher sampling rates over portions with lower sampling rates, or to prefer the portion with a sampling rates most near to a target rate.

If, for example, the user decides that X samples per centimeter is ideal for the application where the scene model is to be used, the version of the wall that closest approaches this sampling rate is preferred. As the camera moves from far to near the scene, the sampling rate will increase and the new frames will replace the surfaces scanned by the earlier frames. Once the camera passes the point where the distance to the wall translates to X samples per centimeter, the new frames will not improve over what is already in the model since they will have a sampling rate higher than desired and therefore the redundant portion of the new frames will be discarded.

Depth images are used to represent the scene and to efficiently merge and render the 3D model. A depth image is an image enhanced by adding to each pixel a depth value indicating how far the scene seen by that pixel was from the camera. Enhanced pixels are called pixels with depth. The depth for pixels corresponding to image dots was previously determined during depth registration. To enhance the remaining pixels with depth, the known depth values are interpolated to provide depth to pixels located between image dots.

Initially the scene model is empty, it has no depth images. The depth images are created on demand as modeling progresses. When the first pixel with depth of the first frame is added to the model, the first depth image is created. All the pixels with depth of the first frame are added to the model since they all see scene surfaces that were not seen before. Adding a depth pixel is done by incremental projection from the frame to the model depth image.

Pixels with depth are added to the 3D model to create model depth images. Whether a pixel with depth is added or discarded, and how it is added, depends on the location and depth value of the pixel. Various actions are taken according to the following cases:

Case 1. If the pixel with depth does not map to any existing depth image in the model because it is outside the field of view of all of them, a new depth image is created and the pixel with depth is added to the newly created depth image.

Case 2. If the pixel with depth does map to one or several existing depth images, such as for a surface in front of or behind the pixels with depth in the existing depth images, a new depth image is created and the pixel is added to it, like in the first case.

Case 3. the pixel with depth maps to one or several existing depth images but there are no pixels with depth at these locations in the depth images, the pixel with depth is added to the first depth image to which it maps.

Case 4. If the pixel with depth maps to one or several existing depth images and the pixels with depth already in these depth images are approximately at the same depth as the current pixel with depth, the new pixel replaces the old pixels if it acquires the scene with better quality. Better is decided according to the quality criteria discussed earlier.

Pixels with depth that land close to the edge of a model depth image are added to two model depth images to produce a small overlap that prevents holes.

A pixel with depth is added to a depth image by splatting, which is the process of writing in the depth image a footprint bigger than one pixel, centered at the location where the pixel with depth projects. The footprint is needed to ensure that there are no gaps in the model depth image. Consider two pixels with depth that are neighbors in the frame. Once mapped to the model depth image they could map to locations that are more than one pixel apart. The footprints of the two pixels with depth are chosen to be big enough to overlap, thus preventing holes. Rectangular footprints are preferred because they are efficient. Circles, ellipses, and other shapes are also possible.

Offsets are used to record the precise position where a frame pixel with depth lands into the depth image. The offsets avoid the truncation error that would result from assuming that it lands at the center of the closest depth image pixel. The offsets improve the accuracy of the model depth images. Images rendered from depth images with offsets are of higher quality.

Rendering

The model depth images are triangulated into a regular mesh, or an irregular mesh if offsets are used. The texture mapped triangles are rendered by the graphics hardware. Model depth images of 256×256 pixels and a triangulation step of 8 pixels yield 2,048 triangles and 256 kilobytes (kB) of texture per model depth image. Commonly known graphics hardware can process more than 100 model depth images concurrently.

A planar surface is modeled with a set of texture-mapped squares, called tiles, in a manner similar to that of curved surfaces. For planar surfaces, per pixel depth is unnecessary. The resolution of the texture is given by the desired sampling rate. The tiles are created on demand as modeling progresses. The frame patch is represented by the set of triangles connecting the dots. The textures of the tiles affected by the current patch are grown by rendering the patch triangles in the textures. The geometry of partially covered tiles is modeled with a triangulated polygon. The polygon is unioned with each new patch and is re-triangulated. When the tile texture is filled, the polygon is replaced with the two triangles defining the tile.

In a preferred embodiment, the user controls the system via a graphical interface that displays the current model, monitors its quality, and reports registration failures. The interface helps the user undo frames, start a scan at the end of a prior scan, and hide, show, save or load parts of the model. The model of the part of the scene currently scanned is rendered continuously to provide immediate feedback. If the color or depth sampling is insufficient for registration, the system prompts the user to bring the camera closer to the problematic surface. If registration is lost, the system returns the user to the last registered frame so that the user may resume capturing video from that location.

Unstructured Scenes

In another preferred embodiment, a 3D model of an unstructured scene, called a depth enhanced panorama, is created. An unstructured scene differs from a structured scene in that the depth-then-color registration algorithm used to register structured scenes does not work because the frame cannot be approximated with a few quadratics. For example, an unstructured scene may be scene containing a pile of small leaves (in contrast to a scene containing two walls, a poster, and a monitor). Because even small camera motions cause dots to fall on discontinuous surfaces, depth can not be used to register frames. The frames can be registered using color only if the ModelCamera rotates about its center of projection.

The process is analogous to stitching photographs together to form panoramas. To achieve real-time registration a registration pattern is used consisting of horizontal and vertical pixel segments similar to the one described earlier. The pixels are transformed from the current frame to the previous frames incrementally with an affine transformation followed by a perspective divide.

Our approach extends color panoramas to support viewpoint translation.

Depth enhanced panorama's (DEP's) remove the fundamental limitation of color panoramas by supporting viewpoint translation, yet retain their speed, convenience, and low cost. The scene can be modeled from several viewpoints by combining several DEP's, which are visualized using a disconnected DEP representation.

As discussed previously, depth samples are obtained by undistorting the frame, finding its laser dots, and computing their 3D positions. Each dot is restricted to an epipolar line because the lasers are fixed with respect to the camera. The line is truncated to the segment that contains the usable depth range, typically 50 cm-300 cm. The segment is searched for an intensity peak that passes 2D symmetry tests. The search is started at the dot from the previous frame. False positives are minimized by requiring that a dot appear at roughly the same place in several frames before it is added it to the model. The laser beams are configured to make the epipolar segments disjoint, which prevents ambiguity in dot/laser assignment.

The 3D position of the dot is calculated by triangulation between the optical ray through the dot and the laser beam.

A DEP consists of a color cube map enhanced with depth samples, and is constructed by registering and merging a sequence of dense color and sparse depth frames. Registration transforms the current frame data from camera coordinates to world coordinates. Since the frames share a common center of projection, they can be registered using only the color data, in the same way that images are stitched together to form color panoramas. Each new frame is registered against the faces of the cube map with which it overlaps.

Fast color registration is achieved by minimizing a color error function whose arguments are the pan and tilt angles. The error of a pixel in the current frame is the RGB distance between its color and the color where it projects in the cube map. Even small camera motions produce rapid, erratic changes in color error. Variability is reduced by convolving the frames with a box filter, for example an 11×11 raised cosine filter.

For efficiency, a registration pixel pattern is used. The pattern consists of horizontal and vertical segments that exhibit considerable color variation. The pixels of a segment share the same row or column and thus can be projected onto the cube map faces with an amortized cost of 3 additions and 2 divisions. The sum of the square of the pixel errors is minimized by the downhill simplex method. The dot pixels are excluded because their color comes from the lasers, rather than from the scene. The simplex method does not require derivatives, which are expensive to compute.

The registered frames are merged into an evolving DEP. The color data is merged into a cube map panorama. The faces of the cube map are divided into tiles. For efficiency, the current frame updates only the tiles that fall within its field of view and are not yet complete.

When there is sufficient color variation in the scene, the segments and the cube map faces are downsampled by a factor of up to 10, which accelerates DEP construction. If the registration algorithm fails, the user easily regains registration by aligning the camera view with the last registered frame.

The video camera adjusts the white balance automatically as darker/brighter parts of the scene are scanned, which assigns the same diffuse surface different colors in different frames. The dynamic range problem is milder than in outdoor scenes. If the user moves slowly between dark and bright regions, registration is robust. New samples are blended with the old samples to obtain better texture uniformity. Blending also hides red artifacts due to laser scattering on thin or shiny surfaces.

DEP Visualization

We have developed DEP visualization methods that produce high-quality images of the scene at interactive rates. The methods support real-time visualization of evolving DEP's, which is integral to interactive modeling.

In one visualization method, a connected representation of the DEP is built by triangulating the projected depth samples on the faces of the cube map. A 3D triangle mesh is created by applying this connectivity data to the 3D depth samples. The 3D triangle mesh is texture-mapped with the cube map faces. During acquisition, the 2D mesh is triangulated incrementally to accommodate the depth samples of the newly integrated frame. A Delaunay tree is used with logarithmic expected insertion time.

A disconnected visualization method for DEP's is similar to the splatting techniques of point-based modeling and rendering. A texture-mapped square splat for each depth sample is generated where the splat size and normal are derived from the neighboring depth samples. The neighbors are stored in quad-trees for real-time access. Each depth sample is stored in the appropriate tree using its projection onto its face. The neighbors are triangulated and the normals of the triangles are averaged to obtain the splat normal. The splat size is derived from the distances to the neighboring depth samples. The splats are texture mapped with the cube map faces. The splatting visualization technique is used when the scene is modeled with multiple DEP's.

Multiple Viewpoints

If the desired view is close to the viewpoint of the DEP, a single DEP produces high-quality visualizations of the scene. A wider range of views is supported by acquiring several DEP's of the same object.

The user builds the first DEP as before, examines it for missing or poorly sampled surfaces, moves the ModelCamera to a second viewpoint, registers that viewpoint, and builds a second DEP. The viewpoint registration is interactive: the user specifies three pairs of corresponding scene points in the two views and the system computes the ModelCamera motion between the viewpoints. The first DEP and the evolving second DEP are visualized continually in the splatting mode to guide the user in completing the model and the last video segment.

EXAMPLES

An embodiment of a real-time hand-held ModelCamera was constructed that includes a video camera mounted to a frame containing 16 laser beam projectors capable of acquiring 15 frames/second. The camera is a progressive-scan camera capable of capturing images at 720×480×3 pixel resolution. The lasers are red (635 nm), have an emitting power of 5 mW (class IIIa), and a dot size of 6 mm/12 mm at 5 m/15 m. The camera is linked to a computer via a Firewire interface. The lasers are mounted in a 4×4 matrix pattern surrounding the camera to generate 16 distinct dots in its field of view. The lasers are pointed to converge near a single point in front of the camera and then diverge on the far side of that point. The convergent and then divergent setup of the lasers allows the user to vary the sampling rate by zooming in and out. A Pentium IV based computer operating at a speed of 2 Ghz, having 2 GB of RAM, was used. As a result of the computer's limited bandwidth, frame processing speed was limited to 5 frames/second.

Another embodiment of a real-time hand-held ModelCamera was constructed that includes a diffraction grating lens producing 49 laser beams in a 7×7 matrix pattern. The camera and computer were like those used in the first embodiment.

While the present method has been illustrated and described in detail in the drawings and foregoing description, such illustration and description is to be considered as exemplary and not restrictive in character, it being understood that only exemplary embodiments have been shown and described and that all changes and modifications that come within the spirit of this description and the attached claims are desired to be protected.

The invention claimed is:

1. A method of creating a three-dimensional model of a scene using a video camera and a light projection apparatus, the method including the steps of:
   projecting a plurality of light beams onto a surface of a calibration target using the light projection apparatus to produce an arrangement of dots on the surface of the calibration target;

capturing a plurality of calibration images using the video camera of the arrangement of dots on the surface of the calibration target;

determining an epipolar segment for each dot of the arrangement of dots projected by the light projection apparatus;

orienting the light projection apparatus relative to the video camera such that each of the epipolar segments is disjoint from the other epipolar segments;

continuously projecting the plurality of light beams onto an indoor scene under ambient lighting conditions using the light projection apparatus to produce an arrangement of projected dots on the indoor scene, each of the projected dots of the arrangement of projected dots being projected onto its corresponding epipolar segment;

scanning the indoor scene with the video camera and the light projection apparatus while the light projection apparatus is continuously projecting the plurality of light beams onto the indoor scene and producing the arrangement of projected dots on the indoor scene;

maintaining the same position and orientation of the light projection apparatus relative to the video camera while scanning the indoor scene using a rigid attachment mechanism coupling the light projection apparatus and the video camera;

capturing scene image information with the video camera during scanning of the indoor scene, the scene image information including a plurality of frames, each frame including scene color information and an arrangement of image dots corresponding to the arrangement of projected dots on the indoor scene;

transferring the scene information from the video camera to a computer;

sampling the depth of the indoor scene by finding selected image dots of the arrangement of image dots in the plurality of frames of the scene information, each of the selected image dots being found along its corresponding epipolar segment; and for each selected image dot:

creating an intensity plot along the epipolar segment corresponding to the selected image dot;

locating one or more intensity peaks in the intensity plot;

determining whether the one or more intensity peaks exceed a threshold value;

if more than one intensity peak exceeds the threshold value, then for each intensity peak exceeding the threshold value, analyzing the scene image information for a two-dimensional area including the location of the intensity peak exceeding the threshold value;

locating the selected dot along its corresponding epipolar segment at the location of one of the one or more intensity peaks that exceeds the threshold value;

calculating scene depth information at the location of the selected dot;

processing the scene information in the computer to create a three-dimensional model of the indoor scene;

obtaining the scene color information at the location of the selected dot;

registering overlapping frames of the scene information using the scene depth information and the scene color information;

creating model depth images; and creating a model of the indoor scene by merging the model depth images.

2. The method of claim 1, where the transferring step is continuous.

3. The method of claim 1, where the transferring step is interactive.

4. The method of claim 1, where the transferring step is discrete.

5. The method of claim 1, wherein the registering step using scene depth information comprises:

identifying a translation movement along a normal vector normal to a surface in the scene, and identifying a rotation movement about the two axes perpendicular to the normal vector.

6. The method of claim 1, wherein the registering step using scene color information comprises:

creating a triangle mesh between adjacent dots in the arrangement of dots on the overlapping frames.

7. The method of claim 6, wherein the creating a triangle mesh step further comprises:

identifying a normal vector normal to a surface in the scene;

identifying a translation movement along two axes perpendicular to the normal vector, and identifying a rotation movement about the normal vector.

8. A method of creating a depth enhanced panorama of an indoor scene using a video camera, the method including the steps of:

restricting movement of the video camera to pan and tilt about its center of projection;

continuously projecting structured light beams onto the surface of the indoor scene under ambient lighting conditions such that the projections of the structured light beams create an array of dots in the scene;

capturing scene image information with the video camera from multiple perspectives by moving the camera about its center of projection, the scene information including a plurality of video frames, each of the plurality of video frames including an array of image dots caused by the projections of the structured light beams;

maintaining the same position and orientation of each of the structured light beams relative to the video camera while capturing the scene information from the multiple perspectives;

transferring the plurality of video frames from the video camera for the multiple perspectives to a computer in real-time;

sampling depths of the indoor scene by finding the location of selected image dots of the array of image dots in the video frames by searching along an epipolar line associated with each selected image dot for an intensity peak that satisfies a two-dimensional symmetry test;

calculating scene depth information at the locations of the selected image dots;

obtaining scene color information at the locations of the selected image dots;

registering pairs of overlapping frames using the scene color information; and creating depth enhanced panoramas of the indoor scene.

9. The method of claim 8 further including the steps of:

displaying an evolving depth enhanced panorama of the scene;

providing the user with modeling feedback; and providing the user means for improving the model.

10. The method of claim 8 where the modeling feedback includes oversampling and undersampling signals.

11. The method of claim 8 where the modeling feedback includes loss of registration signals.

12. The method of claim 8 where the means for improving the model include instructions for repositioning the camera when registration has been lost such that the user may re-acquire registration.

13. The method of claim 8 where the means for improving the model include instructions for repositioning the camera when the camera is oversampling or undersampling.

14. The method of claim 8 where the means for improving the model include prompting and acceptance of input via an input device to establish desirable computing parameters.

15. The method of claim 8, wherein the registering step comprises:
    finding pan and tilt rotation angles between overlapping frames to align the overlapping frames; and
    color matching the aligned frames.

16. The method of claim 8, wherein the creating step comprises triangulating the depth information onto faces of a cube map model on which a connected representation of the depth enhanced panorama is constructed.

17. The method of claim 16, further comprising projecting depth samples onto a color panorama, wherein the projected depth samples are triangulated in two-dimensions.

18. The method of claim 16, further comprising applying the connected representation of the depth enhanced panorama to the depth information, wherein a three-dimensional triangle mesh is created.

19. The method of claim 18, further comprising texture-mapping the three-dimensional triangle mesh with the faces of the cube map model.

* * * * *